XR 3,848,096

United States Patent [19]

Marko

[11] 3,848,096

[45] Nov. 12, 1974

[54] METHOD OF AND MEANS FOR HOLOGRAPHICALLY RECORDING AND REPRODUCING INFORMATION

[75] Inventor: Hans Marko, Grafelfing, Germany

[73] Assignee: Krone GmbH, Berlin, Germany

[22] Filed: Aug. 10, 1973

[21] Appl. No.: 387,283

Related U.S. Application Data

[63] Continuation-in-part of Ser. No. 133,134, April 12, 1971, abandoned.

[52] U.S. Cl.... 179/100.3 G, 178/6.7 A, 179/100.3 V, 340/173 LM, 350/3.5

[51] Int. Cl...... G11b 7/00, G02b 27/00, H04n 5/84

[58] Field of Search.......... 179/100.3 V, 100.3 Z, 179/100.3 G; 178/6.7 R, 6.7 A; 350/3.5, 6, 7, 162 R, 162 SF; 340/173 LM; 346/1, 108, 76 L

[56] References Cited

UNITED STATES PATENTS

| | | | |
|---|---|---|---|
| 3,071,036 | 1/1963 | McKnight | 350/6 |
| 3,453,640 | 7/1969 | Blackmer | 346/1 |
| 3,545,834 | 12/1970 | Gerritson | 179/100.3 G |
| 3,572,882 | 3/1971 | Neuman | 350/3.5 |
| 3,615,123 | 10/1971 | Wuerker | 350/3.5 |
| 3,623,024 | 11/1971 | Hamilton | 350/3.5 |
| 3,624,284 | 11/1971 | Russell | 178/6.7 A |
| 3,630,594 | 12/1971 | Gorog | 350/7 |
| 3,674,332 | 7/1972 | Kogelnik | 179/100.3 G |
| 3,770,886 | 11/1973 | Kiemle | 179/100.3 G |

FOREIGN PATENTS OR APPLICATIONS

| | | | |
|---|---|---|---|
| 1,139,955 | 1/1969 | Great Britain | 350/3.5 |

OTHER PUBLICATIONS

Collier, An Up-To-Date Look at Holography, Bell Labs Record, 4/72 pages 103–109.

LaMacchia et al., Coded Multiple Exposure Holograms, Applied Optics, Vol. 7, No. 1, 1/68, pages 91–94.

Arm et al., Holographic Storage of Electric Signals, Applied Optics, Vol. 8, No. 7, 7/69, pages 1413–1419.

*Primary Examiner*—Raymond F. Cardillo, Jr.
*Attorney, Agent, or Firm*—Karl F. Ross; Herbert Dubno

[57] ABSTRACT

A photographic surface is illuminated by coherent monochromatic light from a point source of radiation, such as a laser, which emits a pulsed beam modulated in phase and/or intensity according to an input signal and also generates a bundle of reference light rays incident upon that surface from successively different angles, or with variation of the relative amplitude of its constituent rays according to a continuously changing pattern, to produce an image composed of a succession of elemental holograms with different virtual origins. To reproduce the original signal, the developed image is illuminated by another bundle of coherent light rays of the same frequency varying in its angle of incidence, or in the relative amplitude of its rays, according to the same law as the first bundle; light from the image so illuminated is focused upon a photocell to generate an output voltage varying in magnitude according to the original input signal.

16 Claims, 11 Drawing Figures

3848096
OR IN 179/100.3G

METHOD OF AND MEANS FOR HOLOGRAPHICALLY RECORDING AND REPRODUCING INFORMATION

This application is a continuation-in-part of my copending application Ser. No. 133,134 filed Apr. 12, 1971 and now abandoned.

My present invention relates to a method of and means for holographically recording and reproducing photographically recordable information such as audio or video signals.

Various techniques are known for optically registering such signals on a recording medium such as a tape or a disk. In the latter instance the information is generally inscribed on the disk in the form of a spiral track, advantageously with the aid of a laser ray; see, for example, British Patent No. 1,038,593. As in conventional mechanical sound-recording systems using spirally grooved disks, such as a laser-illuminated record must also be rotated at a predetermined speed during both recordal and playback.

A common disadvantage of both the mechanical and the optical recording systems of this type is the fact that reproduction may be seriously impaired by scratches and other irregularities on the tape or disk surface. Another drawback is the need for continuously moving the tape or disk during recording and reproduction.

It is, therefore, the general object of my present invention to provide a method of and means for optically recording and reproducing audio and video signals in a manner avoiding the aforestated disadvantages.

More specifically, it is an object of my invention to provide a novel type of video or sound record which, even when locally damaged because of careless handling, will preserve the totality of its information, albeit with a somewhat reduced degree of resolution.

It is known that an image of an original or master copy illuminated with coherent light, e.g. was produced by a laser, can be recorded on a photosensitive surface in the form of a hologram by letting light from the master fall upon that surface as a defocused beam of parallel, diverging or converging rays and superimposing upon that beam a bundle of reference light rays of the same wavelength (or frequency), generally obtained from the same source. Such a hologram can be reconverted into a visible image by illuminating it with another bundle of reference light rays corresponding to the first bundle in regard to wavelength and angle of incidence, i.e. in the relative phasing of the light rays impinging upon different parts of the hologram.

In accordance with my present invention, the first bundle of reference light rays, superimposed upon the defocused beam of light carrying the information to be recorded on a photographic surface, is subjected to modulation by an input signal which varies as a function of time and which may affect either the intensity or the phase of that bundle; the second bundle of reference light rays, trained upon the image developed on that recording surface, is modulated in the same manner to reproduce the original information.

More specifically, according to another feature of my invention, the modulation of the first bundle is accompanied by a modulation of the defocused beam (in amplitude and/or in phase) to impose the recordable information upon it; in the subsequent reproduction of that information, light reflected by or passing through the developed image (as the result of its illumination by the second reference bundle) is directed upon a photoelectric transducer whose output is then demodulated to regenerate the modulating signal.

For stereophonic recording and similar purposes, the beam may be subjected to dual modulation with correlated messages which are separately detectable by a transducer. For this purpose, two separate beam portions can be individually modulated (in amplitude and/or phase) with the respective messages so as to provide a composite hologram whose components can be separately reproduced by splitting the second reference bundle into two parts and exposing two transducers at different locations to light rays from the image illuminated thereby.

The term "light," as used herein, is not limited to radiation within the visible spectrum.

The record made in accordance with this invention contains the same information throughout its image area and can therefore reproduce that information in its entirety even if part of its surface were marred or destroyed.

As is well known in the art of holography, a continuous shift in the phase (or angle or incidence) of the reference bundle during recording results in a smearing of the resulting image; thus, the first reference bundle and the associated recording beam should be pulsed, i.e. periodically suppressed, so as to be turned on only for brief instances sufficiently spaced apart to provide distinct holographic images at successive stages of modulation. A similar pulsing of the second reference bundle, during reproduction, is advantageous but not essential.

The modulation of the first reference bundle should be such as to prevent recurrence of the same relative phasing of its light rays during the entire recording period. One way of accomplishing this is to move the virtual origin of that bundle according to a law producing a spiral trace, i.e. with a generally circular motion of progressively increasing or decreasing radius. Another possiblity resides in the interposition of a transparency of nonuniform light transmissivity in the path of this bundle, advantageously in the form of a cylindrical member with a frosted surface rotating with concurrent axial displacement while being traversed by these light rays. Subject to the requirements of exact reproducibility or availability of the same transparency for both recording or reproduction, the light-transmissivity pattern may be random one or may correspond to a predetermined function such as an orthogonal matrix.

The above and other features of my present invention will be described in detail hereinafter with reference to the accompanying drawing in which:

FIG. 1*a* is a diagram illustrating the principle of holographic recording;

FIG. 1*b* is a similar diagram illustrating the principle of holographic reproduction;

FIG. 2 is a diagram generally similar to FIG. 1*b*, illustrating an important aspect of my invention in the reproduction of holographic images;

FIG. 3 diagrammatically illustrates an apparatus for recording information for reproduction in the manner generally indicated in FIG. 2;

Figure 1A:
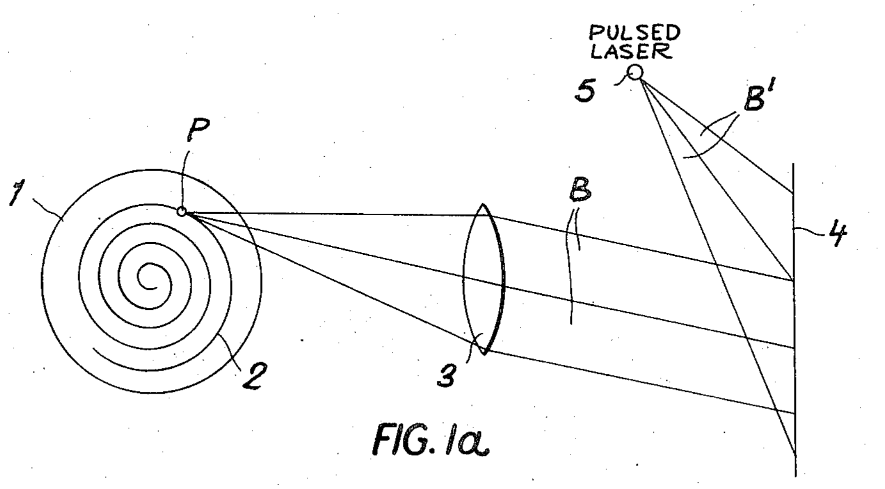

In FIG. 1*a* I have shown a disk-shaped carrier 1 which may be a photographic plate or film and on which a spiral sound or video track 2 has been printed in conventional manner. A source of coherent radiation, specifically a laser 5, casts a bundle B′ of monochromatic light rays upon a photographic receiving surface 4 also constituted by a film, plate or similar transparency; light of the same wavelength, from source 5 or another emitter in step therewith, irradiates the carrier 1 episcopically or by translumination and thereupon traverses a lens 3 casting a defocused beam B upon the surface 4.

A point P on track 2, in the focal plane of lens 3, emits monochromatic light of a given amplitude combining in different phase relationships with the rays of light from source 5 striking different areas of the surface 4. The same applies to each of the other points of the track 2, each point therefore contributing significantly to the intensity of coloration (lightness or darkness) of the holographic image produced on surface 4 by the coincidence of an information-carrying beam B with the reference bundle B′. Thus, a limited area of that surface contains all the information stored in the track 2.

Figure 1B:
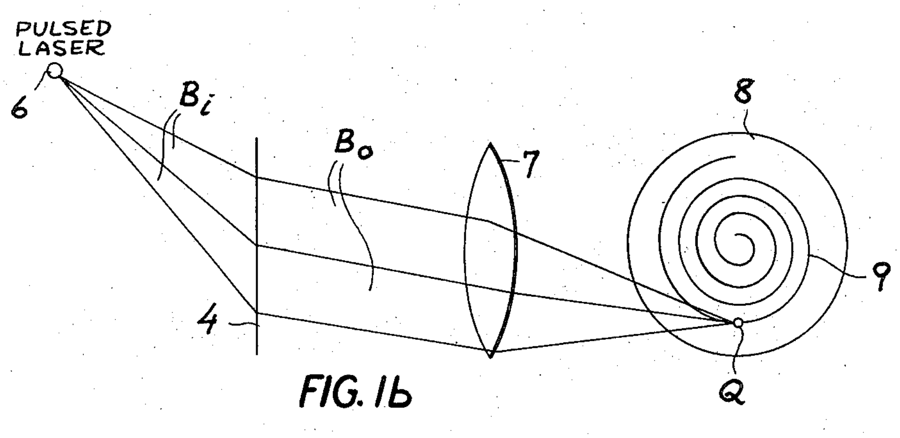

In order to reproduce that information, and as illustrated in FIG. 1*b*, a bundle $B_i$ of light rays from a laser 6, representing a point source of coherent radiation operating on the wavelength of source 5 (FIG. 1*a*), traverses (or is reflected by) the image carrier 4 with its developed hologram. The bundle of light rays $B_o$ coming from the transparency 4 is focused by a lens 7 upon another photographic surface 8, projecting upon it the image of the original track 2.

It will be apparent from FIGS. 1*a* and 1*b* that a partial removal of surface 4 still leaves a field for the reception of some of the rays from point P and for the subsequent focusing of some of the rays from source 6 upon the corresponding point Q of surface 8. Thus, even if the hologram carrier 4 is damaged, the entire information contained in track 2 is preserved and may be retrieved by a photoelectric scanning of the spiral trace 9 by conventional means.

Let us consider the case where, in lieu of the entire support 1 of FIG. 1*a*, only a single point P on its track 2 is illuminated by coherent light laser 5. The image then formed on receiving surface 4 will be an elemental hologram which, upon reproduction, yields the corresponding point Q on carrier 8 (FIG. 1*b*). Thus, if the origin P of beam B were progressively displaced along the track 2 (with pulsing of the laser 5 to avoid smearing), the surface 4 would receive a succession of elemental holograms together defining that spiral track.

Figure 2:
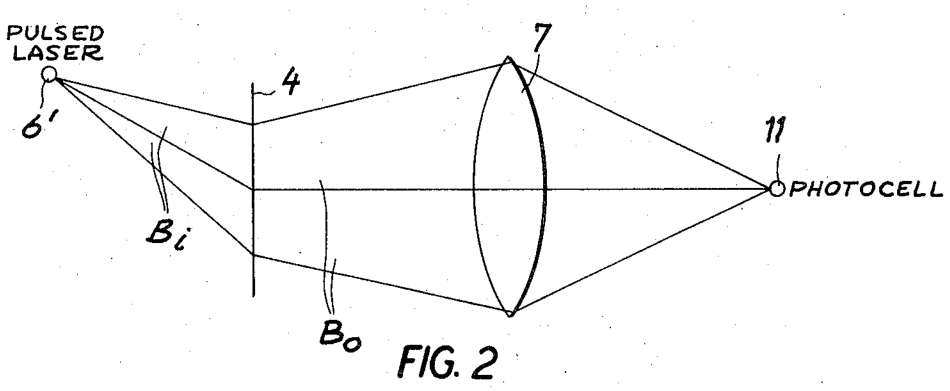

In accordance with an important aspect of my invention, illustrated in FIG. 2, such a stack of elemental holograms can be decoded with the aid of a stationary point receiver of luminous energy, shown as photocell 11, by displacing the reproducing point source 6′ along a corresponding spiral path which collapses the entire trace 9 of FIG. 1*b* at the center of the spiral. Instead of physically moving the laser 6′, I can vary the angle of incidence of the light bundle $B_i$ upon the record carrier 4 in an equivalent manner by suitable light-guiding means as more fully described hereinafter. By the same token, the origin of the information-carrying beam B in FIG. 1*a* can be held stationary if its phase relationship with light bundle B′ in the plane 4 is altered, e.g. in a manner simulating a displacement of point P along the spiral track 2, by a corresponding variation in the angle of incidence of the light bundle B′. More generally, the locus of the virtual origins of the holographic beam need not be a continuous trace; as discussed below with reference to FIGS. 9 and 10, these virtual origins could also be an array of scattered points as long as their pattern is such as to avoid duplication.

In the system of FIG. 2, if the actual or virtual origin of the light bundle $B_o$ is displaced according to the same law as either of the beams B, B′ in FIG. 1*a*, the photocell 11 will generate an output voltage varying in amplitude according to the luminous information picked up by the beam B.

In order to improve the signal-to-noise ratio, the reproducing laser 6 or 6′ may also be pulsed (as indicated in FIGS. 1*b* and 2) in the rhythm of the recording pulses so that the beam is briefly turned on in the same positions of the spiral scan in which the original holograms were generated. Two pulsing systems correlated in this manner have been illustrated in FIGS. 9 and 10 described hereinafter.

Figure 3:
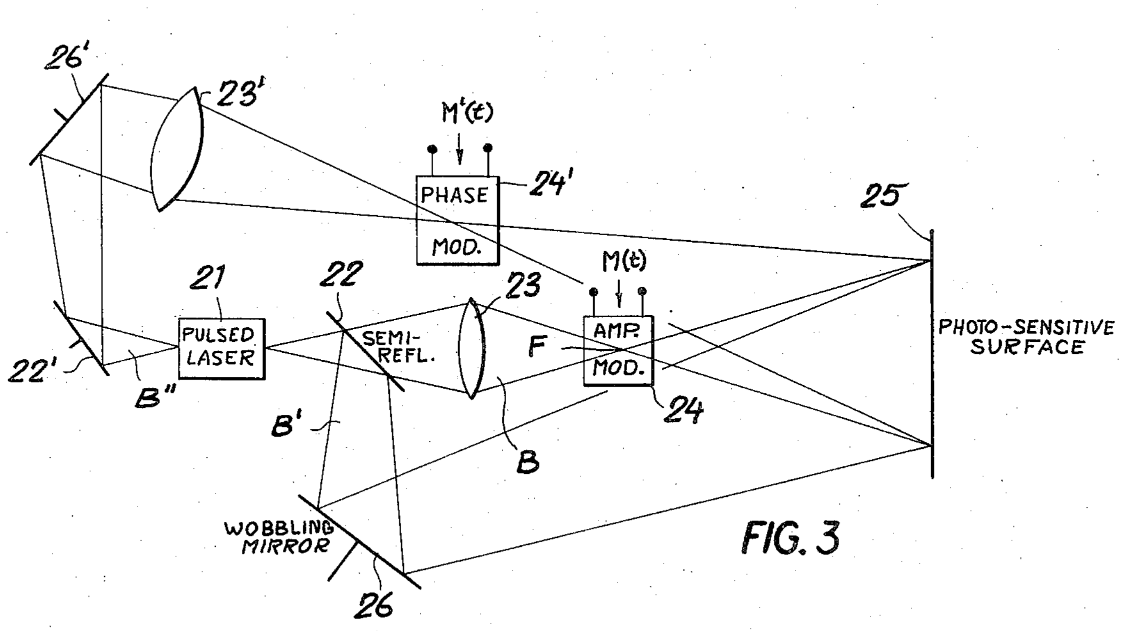

FIG. 3 illustrates the recording section of a holographic system embodying this aspect of my invention. A pulsed laser 21 irradiates a semireflecting mirror 22 which passes part of its radiation to a collective lens 23 generating a beam B of coherent light which is focused at F and defocused in the region of a photosensitive surface 25 similar to surface 4 described above. The reflected part B′ of the beam is directed by a wobbling mirror 26 upon the same surface 25 in superposed relationship with beam B. A modulator 24, controlled by a time-dependent input signal M($t$), varies one of the two aforementioned parameters of the beam (here its amplitude) in the region of the focal point F. At the same time, mirror 26 undergoes a wobbling motion of a nonrecurrent character which continuously modifies the angle of incidence of beam B′ upon surface 25 and therefore alters the relative phase of its light rays at the point of incidence. Another beam portion B″, emitted by laser 21, impinges upon a reflector 22′ and a wobbling mirror 26′ which direct it through a focusing lens 23′ onto the surface 25 by way of another modulator 24′ receiving an input signal M′($t$). In this specific example, modulator 24′ varies the phase of beam B″; in view of the physical separation of beams B and B″, however, both modulators 24 and 24′ could operate either on the amplitude or on the phase. Generally, only one of the two input signals M($t$) and M′($t$) will be present so that either one or the other modulator 24, 24′ will be operational.

In the embodiment here considered, the motion imparted to the wobbling mirrors 26 and 26′ follows the law of a spiral trace with progressively increasing or decreasing radius. To this end the mirror is rocked about two mutually orthogonal axes with conjugate swings of increasing or decreasing amplitude. This has been illustrated in FIG. 4 where a wobbling mirror 32 is universally jointed to a fixed support 31 and has two mutually perpendicular arms X and Y secured to a pair of cylindrical coils 33 and 34, respectively, which surround a pair of fixed permanent magnets 35 and 36. Upon the energization of input terminals 37 of coil 33 and input terminals 38 of coil 34 with alternating currents in quadrature relationship and of progressively varying amplitude, the mirror 32 executes the desired spiral-law motion.

The electromagnetic coils 33 and 34 are representative of a variety of drives for varying the angular position of such a mirror. A piezolectrically controlled mirror of this type, with an angle of tilt of $\pm 6°$ about either axis, is being marketed by Coherent Optics, Inc. of Fairport, N.Y. and has been described in its literature.

Figure 5:
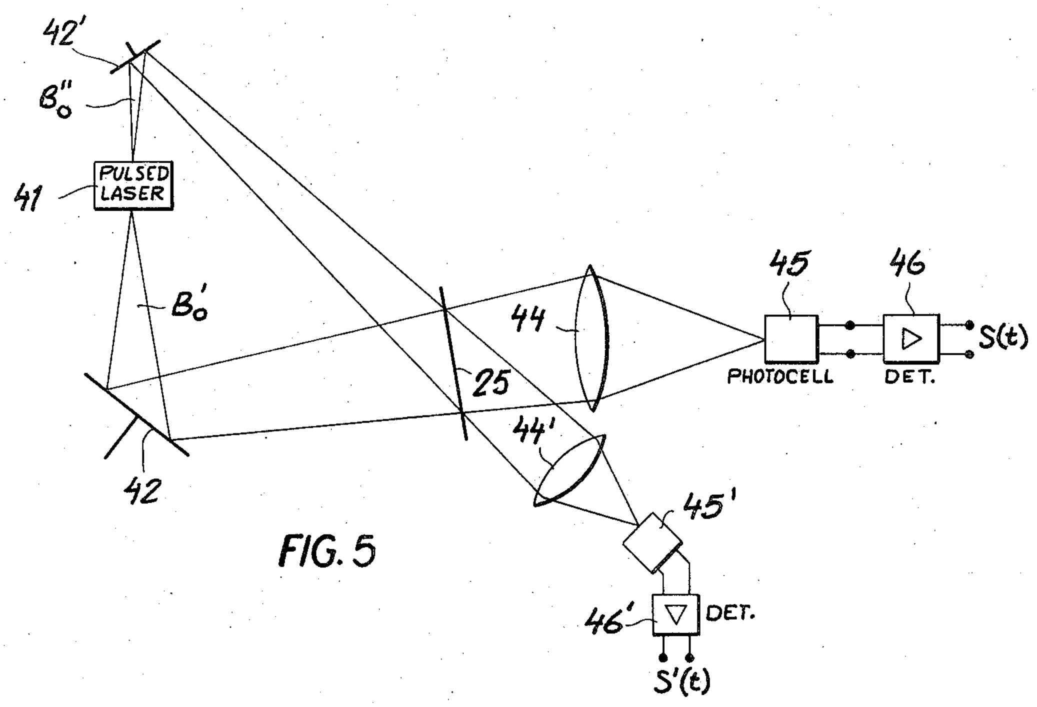
FIG. 5 is a diagram of reproducing apparatus complementary to the recording apparatus of FIG. 3.

FIG. 5 shows a playback apparatus complementary to the recording apparatus of FIG. 3. A pulsed laser 41 emits two beams $B_o'$, $B_o''$, of the same frequency as the output of laser 21 in FIG. 3, to a pair of wobbling mirrors 42 and 42' which redirect them through the transparency 25 carrying the developed hologram with the messages $M(t)$ and $M'(t)$. The two beams are focused by lenses 44 and 44' upon respective photocells 45 and 45' working into detectors 46 and 46'to generate output signals $S(t)$, $S'(t)$ respectively corresponding to input signals $M(t)$, $M'(t)$. Signals $M(t)$ and $M'(t)$ may represent stereophonically picked-up sound waves from a musical performance or the like.

Figure 4:
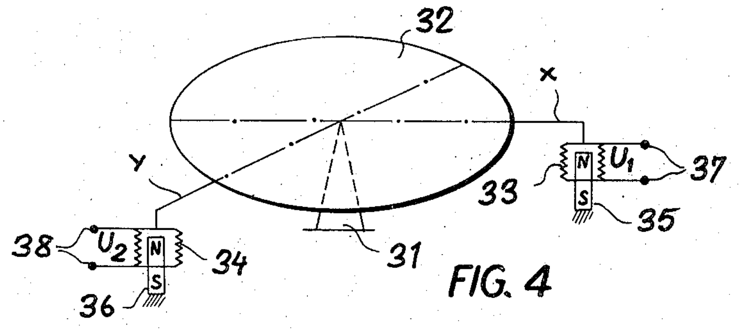
FIG. 4 is a more detailed diagrammatic view of a mobile reflector used in the system of FIG. 4.
Figure 6:
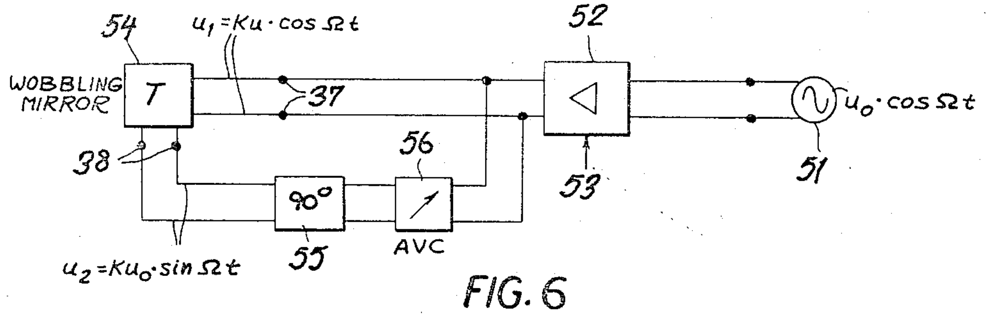
FIG. 6 is a block diagram of a driving circuit for the reflector of FIG. 4.

FIG. 6 illustrates a circuit for the energization of the inputs 37 and 38 of a wobbling mirror 54, representative of any of the mirrors in FIGS. 3 – 5, to generate and reproduce the aforedescribed hologram. This circuit includes an oscillator 51 generating a signal $u_o \cdot \cos\Omega t$ which passes through an amplifier 52 of variable gain provided with a control input 53. A progressively varying control voltage, applied to this input, produces a signal $u_l = Ku_o \cdot \cos\Omega t$, with K representing the amplitude of the sweep and therefore the degree of the angular excursion of the mirror. The output of amplifier 52 is also fed through an AVC circuit 56 to a 90° phase shifter 55 which derives therefrom the complementary signal $u_2 = Ku_o \cdot \sin\Omega t$ impressed upon terminals 38. The wobbling frequency $\Omega/2\pi$ may be on the order of 0.5 Hz, corresponding approximately to the rotary speed (33 RPM) of a conventional long-playing record.

The circuit of FIG. 6 may be used for both recording and reproduction, yet in the latter instance it will be desirable to include additional elements for more precisely tracking the virtual trace of the hologram to compensate for unavoidable deviations. This has been illustrated in FIG. 8 where elements 76 – 80 respectively correspond to elements 52, 51, 55, 56 and 54 of FIG. 6. The control signal applied to amplifier 76 is here derived from a feedback circuit receiving the output signal $S(t)$ (or $S'(t)$, as the case may be) from demodulator 46 (or 46') of FIG. 5. Signal S(t) is amplified in a stage 71 and delivered by way of a band-pass filter 72 to a mixer 73 also receiving a tracking oscillation $r_o \cdot \sin \omega t$ from a generator 74. The d-c component of the output of the mixer 73, selected by a low-pass filter 75, is added to the tracking oscillation from generator 74, fed through a high-pass filter 75a, in the control input of amplifier 76.

Figure 7:
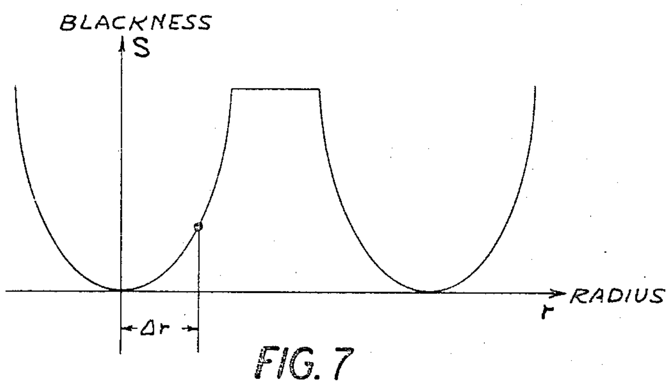
FIG. 7 is an explanatory graph relating to the operation of the system of FIG. 8.
Figure 8:
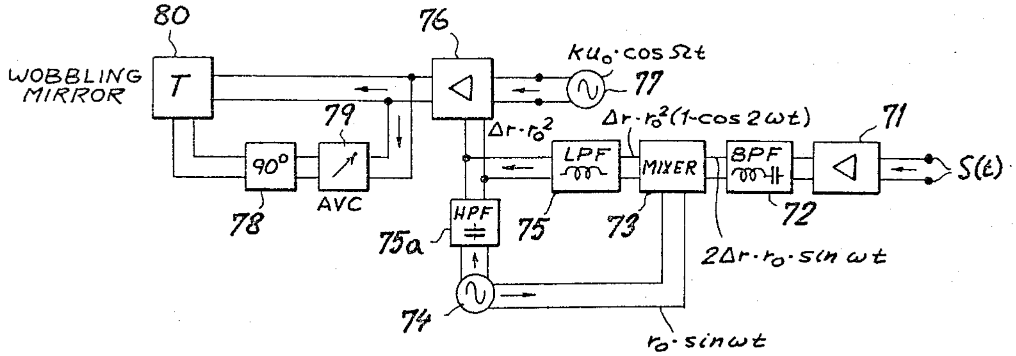
FIG. 8 is a block diagram similar to that of FIG. 6 but including additional circuitry for tracking the hologram during reproduction.

The operation of the circuit arrangement of FIG. 8 will now be explained with reference to the graph of FIG. 7 which shows, along the ordinate, the degree of blackness of the photographic image in the region of two adjoining turns of the virtual spiral trace defined by the hologram, as plotted against radius $r$ along the abscissa. In the ideal situation, i.e. with the demodulating system exactly "on track" (as represented by the origin O in the case of the particular turn here considered), the individual light rays from all the points of transparency 25 combine cophasally at the photocell 45 so that the blackness S will have its minimum value. On either side of the track this value increases substantially according to a parabolic law, i.e.

$$S = r^2 \tag{1}$$

with the superposition of tracking oscillation $r_o \cdot \sin \omega t$, the excursion $r$ becomes $$r = \Delta r + r_o \cdot \sin\omega t \tag{2}$$

whence, in view of equation (1), $$S(\omega t) = (\Delta r + r_o \cdot \sin\omega t)^2 = (\Delta r)^2 + 2\Delta r \cdot r_o \cdot \sin\omega t + r_o^2 \cdot \sin^2\omega t = (\Delta r)^2 + 2\Delta r \cdot r_o \cdot \sin\omega t + r_o^2(1 - \cos 2\omega t)/2 \tag{3}$$

Thus, the middle term $$2\Delta r \cdot r_o \cdot \sin \omega t \textit{ presence}$$

is the only one containing the pulsatance $\omega$; this term, however, comes into existence only if $\Delta r \neq 0$ so that its indicates the existence of a deviation $\Delta r$. Since band-pass filter 72 clears only the frequency $\omega/2\pi$, mixer 73 receives on the one hand the component $2\Delta r \cdot r_o \cdot \sin\omega t$ and on the other hand the oscillation $r_o \sin\omega t$. The output of the mixer has therefore the form $2\Delta r \cdot r_o \cdot \sin\omega t = \Delta r \cdot r_o^2(1 - \cos^2\omega t)$ whose d-c component $\Delta r \cdot r_o^2$ is passed by the filter 75 and delivered as an error signal, together with the tracking oscillation from generator 74, to amplifier 76.

The output signal $S(t)$ is further delivered to a suitable load, not shown, such as a loudspeaker in the case of audio signals or a cathode-ray tube in the case of video signals.

The frequency of the tracking oscillation should be well above the highest signal frequency, e.g. at 20 kHz in sound-reproducing equipment.

A comparison of the system of FIGS. 3 and 5 with conventional recording and playback apparatus of the longplaying type reveals the following:

An LP record playing for a half hour and turning at 33 RPM requires roughly 1000 grooves for a playing time of 1800 seconds, distributed over a radius of about 70 mm. The average groove length equals approximately 140 mm, or 440 mm, so that during one second (corresponding to about half a revolution) 220 mm are available for the registration of $2 \cdot 10^4$ points if the maximum signal frequency is 10 kHz. This represents substantially 100 points per millimeter of groove length, or a total of $40 \cdot 10^6$ for the entire track. A photographic sound track, as utilized in my present system, can have a point density increased by a factor of 10, orresponding to a proportionally reduced record carrier for the same playing time.

Figure 9:
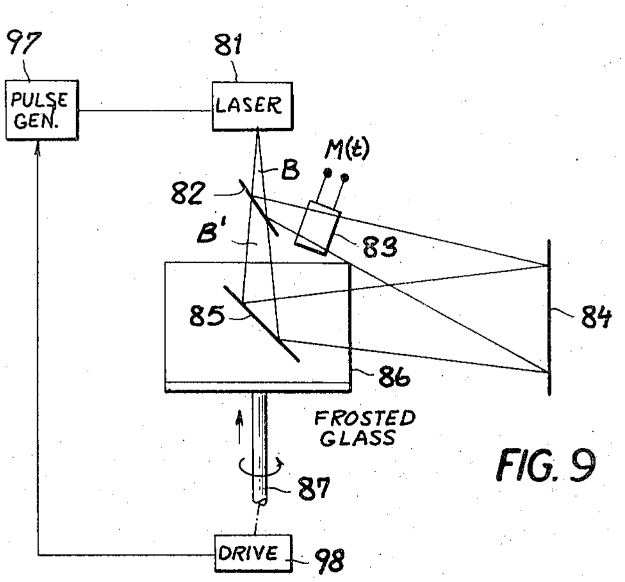
FIG. 9 is a diagram of a modified recording apparatus according to the invention.

FIG. 9 illustrates a modified recording system wherein the beam B from a laser 81, partly deflected by a semi-reflecting mirror 82, is modulated at 83 as previously described (advantageously with interposition of a collective lens not shown) and trained upon a receiving surface 84 which also receives the reference bundle B′ via a reflector 85 inside a cylinder 86. The wall of this cylinder is nonuniformly transparent, e.g. according to a random or "white noise" pattern, consisting in this case advantageously of frosted glass. Such glass, as is well understood, has a roughened surface whose unevenness introduces definite phase differences into the light rays passing through different parts thereof. Cylinder 86 has a stem 87 which is continuously rotated and axially advances by an electric drive 98 actuating a pulse generator 97 in timed relationship with the helicoidal cylinder motion, this pulse generator intermittently triggering the laser 81 so as to quantize the emitted light energy.

Figure 10:
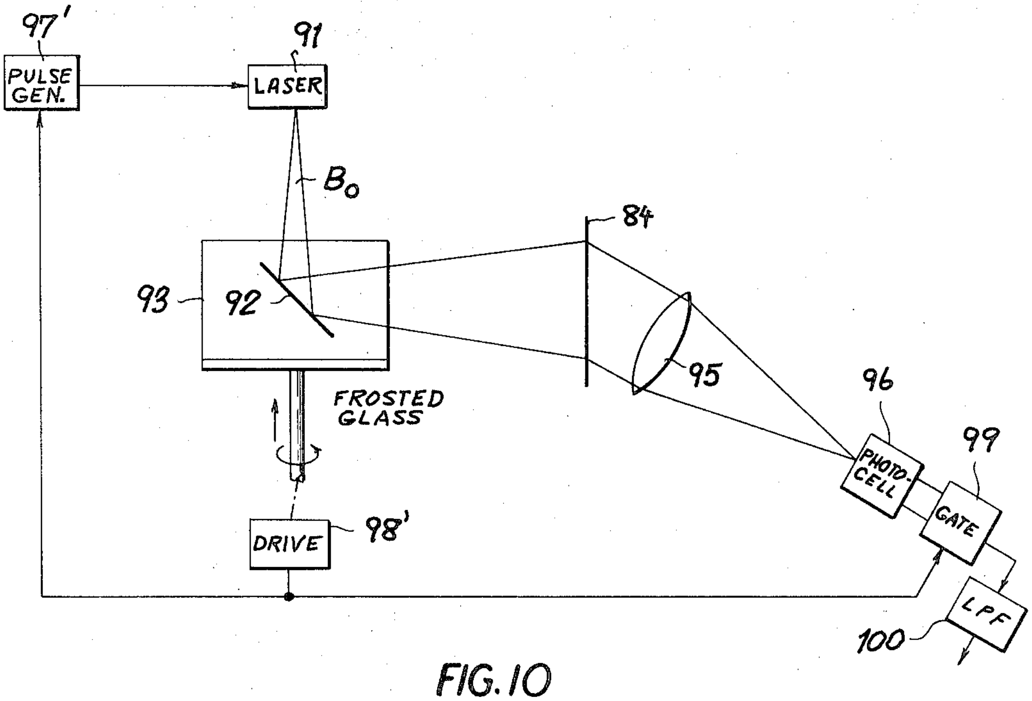
FIG. 10 is a diagram of a playback apparatus complementary to the recorder of FIG. 9.

At the associated demodulator shown in FIG. 10, a similar cylinder 93 is rotated and advanced in like manner by a drive 98′ also controlling the operation of a pulse generator 97′ to trigger an associated laser 91. The beam $B_0$ emitted by this laser is reflected inside cylinder 98 by a mirror 92 through the cylinder wall onto the image carrier 84, thereafter traversing a lens 95 which focuses it upon a photocell 96 whose output reaches the associated load (not shown) by way of a gate 99 and a low-pass filter 100. GAte 99 is periodically opened by the drive 98′, in step with the operation of pulse generator 97′, to pass the output of photocell 96 only during the peak of emission of laser 91. The operating frequency of pulse generators 97 and 97′ should again be above the highest signal frequency, e.g. 20 kHz, and is suppressed by the low-pass filter 100.

Instead of a random pattern, cylinders 86 and 93 may carry a pattern of transparent and nontransparent areas according to a predetermined nonrecurrent code, such as an orthogonal matrix conforming to a cyclic binary function of $x$ and $y$. Suitable orthogonal functions are, for example, the well-known Walsh function (see "Transmission of Information by Orthogonal Functions" by Harmuth, Springer Verlag, Berlin/Heidelberg/New York, 1970) or Hadamard transformation (see 49 Electronics and Communication in Japan 11.247 – 257, 1966). For a more general discussion of orthogonal functions, indicating their nonrecurrent nature over a predetermined range, reference may be made to 12 Journal of Mathematical Physics 311–320 (1933), "On Orthogonal Matrices" by R. E. A.C. Paley.

It will thus be apparent that the method according to my invention creates a photoelectrically reproducible record of message signals in the form of a carrier with a developed photographic image consisting of superposed elemental holograms of different origins that are individually detectable by bundles of incident rays of coherent light, of a predetermined frequency, differing from one another in the relative phasing and/or intensity of their constituent rays.

As regards the modulation of laser beams, reference may be made to U.S. Pat. No. 3,428,810 (describing the pulsing of laser beams) in addition to the aforementioned British Patent No. 1,038,593.

Although the pulsing of the modulated information beam improves the degree of resolution of the resulting hologram, I have been able to verify on the basis of practical tests that such pulsing is not essential and that reproducible records can also be made with continuous beam.

I claim:

1. A method of holographically recording and reproducing information, comprising the steps of:

projecting upon a photographic surface and defocused beam of coherent light carrying photographically recordable information;

superimposing upon said beam a first bundle of reference light rays trained upon said surface, said light rays and said beam having the same wavelength and being pulsed in step with each other;

subjecting said bundle to modulation varying with time as an orthogonal function;

developing the resulting latent image on said surface; and detecting said information by illuminating the developed image on said surface by a second bundle of reference light rays of the wavelength of said first bundle and subjected to modulation varying as the same orthogonal function of time.

2. A method as defined in claim 1 wherein the information is imposed upon said beam by modulating same concurrently with the modulation of said first bundle, the step of detecting said information comprising exposure of a photoelectric transducer to light from said image.

3. A method as defined in claim 2 wherein said beam is modulated in intensity.

4. A method as defined in claim 2 wherein said beam is modulated in phase.

5. A method of holographically recording and reproducing information, comprising the steps of:

projecting upon a photographic surface a defocused beam of coherent light;

superimposing upon said beam a first bundle of reference light rays trained upon said surface, said light rays and said beam having the same wavelength and being pulsed in step with each other;

subjecting said first bundle to modulation of its angle of incidence as a function of time according to a law producing a spiral trace;

imposing photographically recordable information upon said beam by modulating same concurrently with the modulation of said first bundle; and detecting said information by illuminating the developed image on said surface by a second bundle of reference light rays of the wavelength of said first bundle while subjecting said second bundle to modulation of its angle of incidence as the same function of time and exposing a photoelectric transducer to light from said image.

6. A method of holographically recording and reproducing information, comprising the steps of:

projecting upon a photographic surface a defocused beam of coherent light carrying photographically recordable information;

superimposing upon said beam a first bundle of reference light rays trained upon said surface, said light rays and said beam having the same wavelength and being pulsed in step with each other;

subjecting said bundle to modulation varying with time as a random noise function;

developing the resulting latent image on said surface; and detecting said information by illuminating the developed image on said surface by a second bundle of reference light rays of the wavelength of said first bundle and subjected to modulation varying as the same random noise function of time.

7. A method as defined in claim 6 wherein the information is imposed upon said beam by modulating same concurrently with he modulation of said first bundle, the step of detecting said information comprising exposure of a photoelectric transducer to light from said image.

8. A method as defined in claim 7 wherein said beam is modulated in intensity.

9. A method as defined in claim 7 wherein said beam is modulated in phase.

10. A system for holographically recording and reproducing information, comprising:

a source of pulsed coherent light of a fixed wavelength;

pickup means for imposing photographically recordable information upon a beam of light from said source;

projection means for training said beam, carrying such information, in a defocused manner upon a photographic surface;

optical means for directing a first bundle of reference light rays of said wavelength upon said surface concurrently with said beam;

modulating means including a first wobbling mirror for varying the angle of incidence of said first bundle as a function of time, said puckup means including electro-optic means for modulating said beam with said information concurrently with the variation of said angle of incidence of said first bundle by said modulating means;

decoding means including a generator of a second bundle of reference light rays and a second wobbling mirror for varying the angle of incidence thereof as a function of time identical with that of the angle of incidence of said first bundle, each of said mirrors being provided with pair of orthogonally related rocking drives with two conjugate input circuits and a common supply of sinusoidal driving voltage with linearly varying amplitude for said circuits;

illuminating means for directing said second bundle onto an image produced on said surface by said projection means and said optical means;

photoelectric transducer means;

focusing means for directing light from said image onto said transducer means; and demodulating means connected to said transducer means for reproducing said information.

11. A system as defined in claim 10 wherein the rocking drives for said second wobbling mirror are provided with sensing means for maintaining same trained upon a spiral trace defined by the motion of said first wobbling mirror.

12. A system as defined in claim 11 wherein said sensing means comprises an oscillator circuit for superimposing upon said driving voltage a tracking oscillation of substantially higher frequency and feedback means for delivering the output of said demodulating means to said oscillator circuit and for deriving for said output and said tracking oscillation an error signal superimposed upon said driving voltage.

13. A system as defined in claim 12 wherein said information consists of signal frequencies within a predetermined range, said tracking oscillation having a frequency substantially above said range.

14. A system for holographically recording and reproducing information, comprising:

a source of pulsed coherent light of a fixed wavelength;

pickup mens for imposing photographically recordable information upon a beam of light from said source;

projection means for training said beam, carrying such information, in a defocused manner upon a photographic surface;

optical means for directing a first bundle of refernece light rays of said wavelength upon said surface concurrently with said beam;

modulating means for varying the phasing of said light rays as a function of time;rays as a function of time;

decoding means including a generator of a second bundle of reference light rays with a phasing varying as a function of time identical with that of said first bundle; and illuminating means for directing said second bundle onto an image produced on said surface by said projection means and said optical means;

said modulating means and said decoding means each including a cylinder of frosted glass in the path of said first and said second bundle, respectively, and drive means for axially advancing and simultaneously rotating said cylinder.

15. A system as defined in claim 14 wherein said source and said generator each comprises a laser and trigger means for periodically activating said laser, at a cadence exceeding the highest information frequency, in step with the associated drive means.

16. A system as defined in claim 14 wherein said pick-up means includes electro-optic means for modulating said beam with said information concurrently with the variation of said parameter of said first bundle by said modulating means; further comprising photoelectric transducer means, focusing means for directing light from said image onto said transducer means, and demodulating means connected to said transducer means for reproducing said information; said demodulating means including gate means synchronized with the trigger means of said generator and a low-pass filter beyond said gate means.

* * * * *